March 30, 1926.  1,578,895

A. L. JOYCE

CHART

Filed Nov. 1, 1923  2 Sheets-Sheet 1

Agnes L. Joyce
INVENTOR
BY Carl Kraft
AS HER ATTORNEY

March 30, 1926.

A. L. JOYCE

CHART

Filed Nov. 1, 1923    2 Sheets-Sheet 2

1,578,895

Agnes L. Joyce
INVENTOR
BY Carl Kraft
AS HER ATTORNEY

Patented Mar. 30, 1926.

1,578,895

UNITED STATES PATENT OFFICE.

AGNES L. JOYCE, OF NEW YORK, N. Y., ASSIGNOR TO CARL KRAFT, OF NEW YORK, N. Y.

CHART.

Application filed November 1, 1923. Serial No. 672,056.

*To all whom it may concern:*

Be it known that I, AGNES LOW JOYCE, a citizen of the United States, and a resident of Bronx County, in the city of New York and State of New York, have invented new and useful Charts, of which the following is a complete specification.

My invention relates to illustrative charts in general. I have conceived a means whereby such charts may be used individually and collectively to great advantage. I have designed a series of superimposed charts so that on each individual chart is represented a unit or integral part of the entirety. I have superimposed these charts and cut out parts of the uppermost charts so that the superposition of individual charts gives a unified view of the whole or assembled object.

This educational series of charts enables me to show in detail each part of a large object without disturbing its relation to the entirety. It also enables me to show the detailed object with the necessary descriptive matter all on one individual sheet with a great saving of space.

In many cases, I combine these charts into the form of a book.

A second feature is that I may, in the design and construction of such a series of charts, transfer this view to the edge or terminal part of a sheet and thus have the view serve as an index also. It means in short, a combined index and unified picture.

Some objects lend themselves particularly to representation in the terms of a so-called "exploded view." My method of combining the index of the series of charts with the assembled view is also applicable in such cases.

In using charts of this type made by my method I frequently use both the back and front of the chart, utilizing all indices, orifices etc., in the charts whether on the obverse or reverse side and I consider this another step in my invention.

It must be understood that extra sheets or leaves may be interposed between adjacent views without disturbing the utility of the method.

I have added an illustrative drawing showing preferred embodiments of graphical representation by means of charts.

Fig. 1, shows a plan view of a series of charts such as might be used for classroom display in a large size or for book use in a smaller size.

Fig. 2, shows page 1 individually.
Fig. 3, shows page 2 individually.
Fig. 4, shows page 3 individually.
Fig. 5, shows the last page individually.
Fig. 6, shows a book composed of my charts. In this book the figure is combined with the index.

Figure 1:
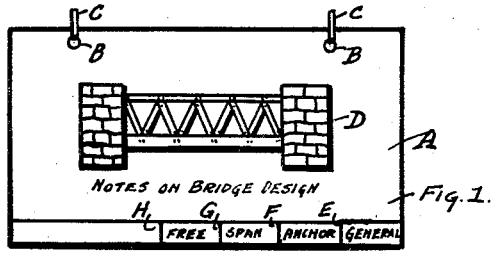

In Fig. 1, the pages A, are fastened by the rings C in the holes B. The figure D is shown by the super-position of four successive pages marked by the index E, F, G, and H.

Figure 2:
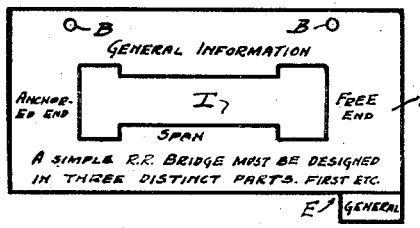

In Fig. 2, is shown the first page with the section I cut away to expose the views beneath it. Descriptive matter as desired is added to the page as shown.

Figure 3:
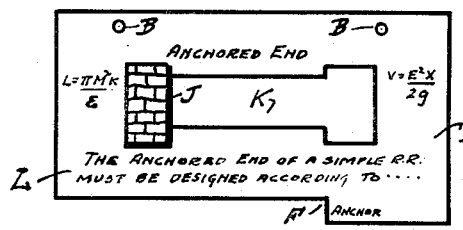

In Fig. 3, is shown the detail of the anchored section of the bridge J, the part K being removed so as not to cover the detail views underneath the F page. It will be noted that the descriptive matter is placed immediately adjacent the part under consideration.

Figure 4:
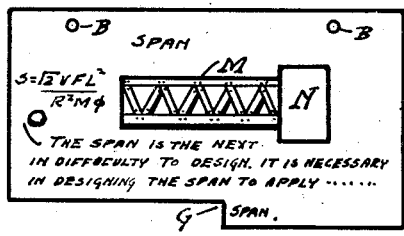

In Fig. 4, the span M is the detail view, the opening N remaining to expose the picture on the last page. The descriptive matter O pertains chiefly to span M.

Figure 5:
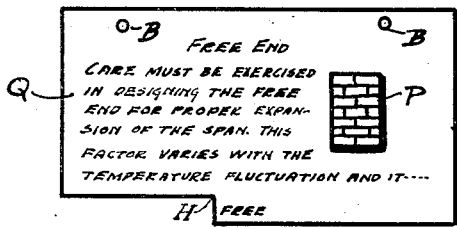

In Fig. 5, the free end of the bridge P, with its foundation is considered. The descriptive matter is indicated at Q.

Figure 6:
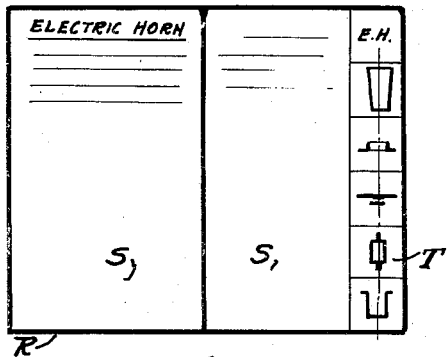

In Fig. 6, the method is shown applied to a book R, having pages S. Here the index T is shown in conjunction with a view of the object. On each indicated page is descriptive matter pertaining to the matter indexed.

Figure 7:
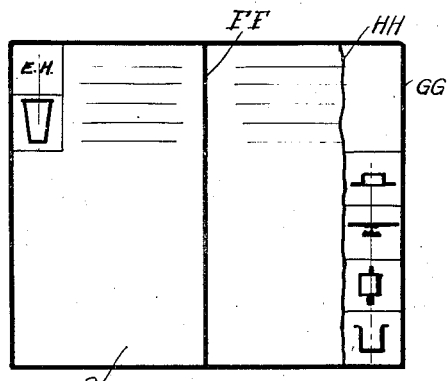
Fig. 7, shows the same book opened to about the middle showing how both sides of the index are used. This shows a so called "exploded view" but an ordinary view may be used if desired.

In Fig. 7, the same book is shown opened to demonstrate the utilization of both sides of the index.

Line FF shows the binding of the book and GG shows the extremity of the page. If additional descriptive matter is needed, pages may be inserted from FF up to but not beyond HH. These short pages in no way interfere with the assembled or detail views. It will be noted also that as the larger pages are turned over, as in reading, the assembled pictures on the right hand margin is reduced while the assembled picture on the left extremity of the book is built up.

Figure 8:
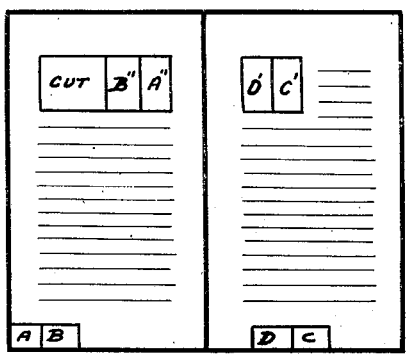
Fig. 8, shows a book of superimposed series opened. In this case the index is separate, but the method of utilizing the sides of the page can readily be seen.

In Fig. 8, is shown a book of a superimposed series with the index separate to show how, on the reverse side of the page the orifices are utilized to advantage.

Figure 9:
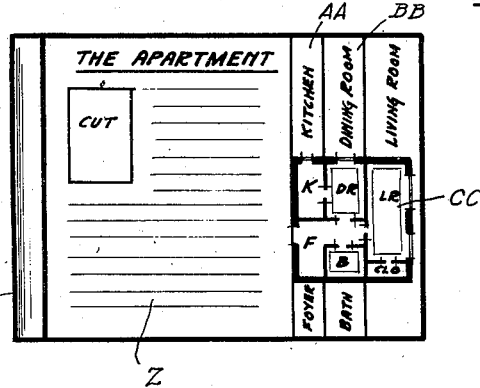
Fig. 9, shows another type of chart.

Fig. 9, shows a special form of combined index and chart.

DD shows the binding of the book. Z is the first page of reading matter. AA shows part of the apartment, this being the assembled view. BB shows another part of the apartment, and CC, the bottom page, shows still another. Now, there is shown, an apartment. If details of the dining room are desired, it is only necessary to turn to page BB to get them for the reading matter there is concerned only with dining room and both. Obviously, other sub-divisions might be made of such of floor-plan.

Figure 10:
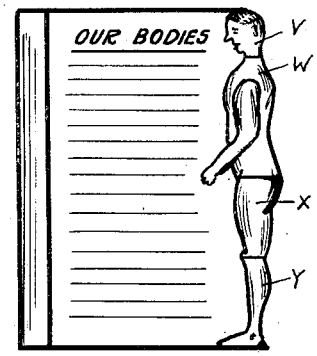

Fig. 10, shows a combined index and chart in which the chart is cut to accommodate a given contour. The general description of the body is first given in this series of charts. To refer to details such as head, arms, legs, it is necessary to turn to such pages as the corresponding picture is part of. Thus the body shown consists of a series of detailed drawings, lower legs, upper legs, body (or trunk), arms and head, all properly superimposed and operatively connected together.

Let us consider the use of the first series of charts in Figs. 1 to 5. We have here a complete picture of a bridge with descriptive matter on the whole bridge where it reads "A simple R. R. bridge etc. (Fig. 2)." Thus we are familiarized with the general statements of the bridge as a unit on the first page.

Now assume we wish to learn details of one end, the anchored end. Our index guides to chart Fig. 3. The other charts are turned back on rings C, exposing the detailed information on the anchored end always keeping the anchored ends in its proper relation to the entire bridge.

It must be understood that I might apply these ideas to maps, charts of machinery and countless other objects without departing from the spirit of this invention.

What I claim and what I desire to secure United States Letters Patent for is:

1. Graphical charts consisting of detailed views adapted to be superposed, each of which contain one or more detail elements, said detailed views adapted to be assembled into a unified picture; in which series each detailed view is accompanied by descriptive matter.

2. Graphical charts consisting of detailed views adapted to be superposed, each of which contain one or more detail elements, said detail views adapted to be assembled into a unified picture; said series being maintained in an operable sequence; and into which series may be added additional leaves for descriptive matter without affecting the detailed views or the assembled view.

3. Graphical charts consisting of detailed views adapted to be superposed, each of which contain one or more detail elements, said detail views adapted to be assembled into a unified picture; in which the said picture is also an index.

4. Graphical charts consisting of detailed views adapted to be superposed, each of which contain one or more detail elements, said detail views adapted to be assembled into a unified picture; combined with which is an index; which index is directly associated with the unified picture, each designation corresponding to an associated detail view being part of the page containing said corresponding detail view.

5. Graphical charts consisting of detailed views adapted to be superposed, each of which contain one or more detail elements, said detail views adapted to be assembled into a unified picture; in which series of superimposed detail views both obverse and reverse sides of the illustrations are utilized to form one unified picture each.

6. Graphical charts consisting of detailed views adapted to be superposed, each of which contain one or more detail elements, said detail views adapted to be assembled into a unified picture; combined with which is an index; which index is directly associated with the unified picture, each designation corresponding to an associated detail view being part of the page containing said corresponding detail view; in which series of superimposed illustrations both obverse and reverse sides of the index are utilized.

7. Graphical charts consisting of detailed views adapted to be superposed, each of which contain one or more detail elements, said detail views adapted to be assembled into a unified picture; combined with which is an index; which index may be superimposed upon the unified picture, each designation corresponding to an associated detail view; in which series of superimposed illustrations both obverse and reverse sides of the index are utilized; in which series the index may be so cut as to represent the object depicted.

In witness whereof I hereunto subscribe my name this 22nd day of August, 1923.

AGNES I. JOYCE.